Sept. 20, 1938.   B. W. HAMMER ET AL   2,130,644
APPARATUS FOR TREATING LACTIC FLUIDS
Filed Nov. 23, 1935   7 Sheets-Sheet 1

Inventors
Bernard W. Hammer,
Herman C. Horneman,
Sidney N. Quam,
Fred F. Lockwood,
Howard F. Beery,
Milton E. Parker
By Cushman, Darby, & Cushman
Attorney Patented Sept. 20, 1938

2,130,644

UNITED STATES PATENT OFFICE 2,130,644

APPARATUS FOR TREATING LACTIC FLUIDS

Bernard W. Hammer, Ames, Iowa, Herman C. Horneman, Sidney N. Quam, and Fred F. Lockwood, Danville, Ill., Howard F. Beery, Omaha, Nebr., and Milton E. Parker, Danville, Ill., assignors to Sealtest System Laboratories, Inc., New York, N. Y., a corporation of Maryland Application November 23, 1935, Serial No. 51,278

4 Claims. (Cl. 99—251)

This invention particularly relates to apparatus for (1) pasteurizing liquids; (2) deodorizing liquids (i. e., removing undesirable odors and off-flavors); and (3) cooling liquids. The apparatus is useful for accomplishing any two of these operations, or particularly, for carrying out all three, as an intermittent, continuous or simultaneous treatment. The invention is used in connection with various classes of liquids and fluids, of which milk, cream, and lactic fluids in general are exemplary.

Milk products such as milk or cream often have characteristic odors and flavors which are undesirable and must be removed. These develop from various sources and during certain periods of the year. Many of these objectionable odors and flavors are stubborn and tenacious and require drastic treatment to denude the lactic fluid of them.

In accordance with the apparatus of this invention, lactic fluids of the order of the milk or cream are rendered practically free of off-flavors and odoriferous substances regardless of their excessive concentration or persistence.

While conventional methods of pasteurizing and cooling lactic fluids such as milk or cream, do, to a limited extent, tend to improve the flavor and odor of these products by partially volatilizing the off-flavor and undesirable odor imparting substances therefrom, the present invention so augments and enhances this volatilizing effect as to reduce the off-flavors and odors to a negligible or substantially imperceptible quantity in the end product.

Briefly stated, the invention initially provides a steam treatment for (1) pasteurizing a fluid, for example, cream, and (2) subdividing the cream to release undesired substances and render those remaining in the cream, which may be in excessive concentration and/or persistent, potentially releasable, i. e., removable by subsequent treatment of the cream. This initial treatment takes place upon a travelling confined mass of the fluid-steam mixture.

Preferably, as a subsequent and continuous operation with the initial treatment, the pasteurized and subdivided cream in the form of a cream-steam-water mixture is continuously introduced through a reduced outlet into a vacuum chamber where, under conditions of reduced pressure, it, spontaneously and with violent and explosive force, expands into a fog or mist-like state. This final state of subdivision of the preliminarily treated cream permits separation of the undesirable volatiles simply and completely and recovery of the cream substantially devoid of objectionable off-flavors and odor imparting substances.

In the preferred form of the invention, the cream is compressed and heated; live steam at high temperature and the compressed cream are then formed into fine streams or jets of high velocity. The two jets are directed so as to intersect with violent agitation, whereby the cream is bombarded and shattered or sheared by the steam. Stated another way, two high velocity intersecting streams respectively of steam and cream are produced, the velocity of the cream being assisted by the aspirating effect of the steam, and the bombardment or contact of cream and steam results in heating of the cream, with (1) simultaneous tearing apart of the cream particles and subdivision thereof and intimate mixture of the steam with the cream, forming a cream-steam-water mixture having substantially a mist-like form, and (2) concomitant expansion of the mixture with enhanced tearing apart of the cream particles, in the zone of low pressure created by the high velocity streams.

As one means for accomplishing these effects, we employ a Venturi type of injector device having means for producing separate steam and cream jets of high velocity and in which the cream-steam-water mixture so formed is caused to expand by reason of the reduced pressure obtaining in the gradually enlarging side of the venturi and leading to a conduit which communicates with the vacuum chamber. Hence, a very fine subdivision is produced, namely, the resultant of (1) the discharge of the cream at high velocity through a reduced opening, (2) the bombarding and heating of the cream stream with steam at high velocity, and (3) the expansion of the cream-steam-water mixture in the tapering outlet in the venturi which latter increases in diameter toward its jointure with the conduit. This preliminary treatment will condition cream having excessive concentrations of off-flavors and odoriferous substances of the most tenacious nature, and result in the release of a substantial portion of these as volatiles and render the remainder potentially releasable to the optimum in the continuing procedure of the invention. Specifically, odoriferous and off-flavor substances are released due (1) to the mechanical tearing apart of the cream particles, and (2) to the expansion of the cream-steam-water mixture. As the cream-steam-water mixture passes beyond the influence of the zone of reduced pressure in the venturi, the velocity decreases and the conduit or line leading to the vacuum chamber becomes filled with the cream-steam-water mixture as a liquid column under increasing pressure. As will be understood, the fluid confined in the line will be under an increased pressure accompanied by a decrease in velocity, e. g., in accordance with the quantitative law with regard to changes in pressure and changes in speed as expressed by Vernoulli's theorem. The cream is pasteurized and further conditioned to enhance the release and potential release of undesired substances during travel in the line or conduit and the compressed cream-steam-water mixture is introduced into the vacuum chamber through a reduced outlet, spontaneously and violently assuming a fog or mist-like state.

We have also discovered, as a modification and in lieu of the initial treatment just described, that pasteurization and subdivision of the cream particles is satisfactorily accomplished by injecting live steam under pressure in the form of needle-like jets into a travelling liquid column of cream and producing a multiplicity of impacts or impingements by the steam upon the cream whereby mixture of the steam and cream takes place in a manner to agitate and thoroughly comb the cream with steam. At the same time, this treatment imparts to the mixture a turbulent and whirling movement in the direction of travel of the cream toward the vacuum chamber.

In each of the processes described, the cream is preliminarily (1) pasteurized at high temperatures in the line, (2) intimately mixed with steam and agitated and shattered, i. e., the cream particles are torn apart and subdivided by the steam and (3) conditioned to have the objectionable volatiles released or rendered potentially releasable.

In the initial steam treatment, the latent heat of the steam is very largely transferred to the cream and (1) part of the steam condenses and (a) the heat of condensation also is transferred to the cream, resulting in a cream-steam-water mixture having a pasteurizing or sterilizing temperature of substantially 200 to 250° F. or higher; (b) the condensation of the steam with sudden collapse of the steam bubbles upon coming in contact with relatively cooler cream will cause a breaking up of the fat globules with consequent release or potential release of volatile odoriferous substances occluded within the fat globules, and (c) the heating effect, the release of volatiles, and the uncondensed portion of the steam produces a compression, and (2) the uncondensed steam exerts a sweeping action in that it serves as a carrier for the volatile or vapor phase constituents of the cream released by the shattering actions and heating effect of the steam.

The cream-steam-water mixture is compressed in the line or conduit (a) due to the heating effects of the steam as just described, (b) due to the pumping pressure for conveying the cream to the line and thence to the vacuum chamber, (c) because of the injection of steam under pressure, and (d) by reason of the back pressure created by the reduced size of the outlet of the distributor head in the vacuum chamber cooperating with the positive pumping and steam pressures. Also in some cases, we continuously inject steam under pressure, e. g. live steam around 325° F., eighty to one hundred pounds gauge, into the cream-steam-water mixture at the distributor head for increasing the compression. This compression of the cream-steam-water mixture in cooperation with the reduced pressure in the vacuum chamber and the reduced outlet in the distributor head causes the mixture to be discharged into the vacuum chamber with explosive and violent expansion whereby the mixture spontaneously assumes a substantially fog-like state. As will be appreciated, the fluid, while travelling to the vacuum chamber, is constantly treated and conditioned, being (a) heated, compressed, expanded and compressed, or (b) heated and compressed, and then (c) in either case, expanded in the vacuum chamber. As stated, the preliminary treatment and conditioning takes place while the cream is travelling in the line and the cream is preferably continuously introduced therefrom into the vacuum chamber, providing a continuous system. It is considered that the optimum conditioning of the cream is due to the presence of each of the several factors outlined which cooperate with each other to afford a preliminary treatment such that the final product is of enhanced quality and the operation economical and universal for plant practice.

By pasteurizing is meant heating the fluid during travel through the conduit in direct contact with the steam and within both the conventional flash pasteurizing range of substantially 165 to 190° F., and particularly at higher temperatures, i. e., above the normal flash pasteurizing temperatures and within a sterilization range of substantially 200 to 250° F. or higher. In other words, pasteurization at a high temperature, that is, above the boiling point of the fluid at normal atmospheric pressure, is accomplished with this invention.

With respect to the vacuum chamber, we have found that by recourse to either of the preliminary treatments described, and the use of a distributor head having a reduced outlet, optimum advantage can be had of the reduced pressure maintained within the vacuum chamber. That is, the cream is conditioned in the line for optimum expansion in the vacuum chamber so that the two stages or steps are interdependent and assure the desired final result, namely a cream substantially denuded of its objectionable characteristics. The vacuum chamber affords a simple and efficient means of separating and removing the vapor phase constituents, including the undesirable volatiles, from the cream.

The vacuum chamber is characterized by being heated. In this manner condensation of water vapors and condensable odoriferous and off-flavor imparting volatiles and their attendant objectionable return to the cream is prevented; likewise separation of liquid and vapor phase constituents is maintained or prolonged, and, moreover, complete separation of liquid phase particles of cream is obtained.

As will be appreciated, where steam is used, a cream-steam-water mixture will be produced, while the lactic product is initially heated under compression, and the expansion treatment of this cream-steam-water mixture in the vacuum chamber is characterized by removal of moisture and odoriferous and off-flavor imparting substances. As a result, the end product has improved organoleptic qualities and a moisture content substantially that of the original cream. That is, although dilution will take place in the initial compression and shattering of the particles with steam, this condensation water is more or less removed in the subsequent expansion-subdivision treatment in the vacuum chamber and the mixture is condensed whereby the final effect is one of recovering the cream in substantially its original volume but denuded of objectionable flavors and odors.

Another advantageous step of the process of this invention, as where the concentration of off-flavors and/or odors is excessive or of a stubborn nature, resides in subjecting the cream either (1) to a preliminary steam scrubbing or deodorizing distillation treatment prior to the initial compression, and subsequent expansion in the vacuum chamber as above described, and/or (2) to a similar scrubbing (a) continuously in the presence of the expansion treatment, (b) continuously in a separate chamber, or (c) in batch in the vacuum chamber or a separate chamber.

In connection with the scrubbing step where the fluid is treated while in continuous flow, we cause the flow to be serpentine, e. g. the fluid is travelled continuously through interconnected compartments, and we pass the fluid through the outer compartments consecutively and into a central compartment from which it is withdrawn in finally scrubbed condition.

The process of continuous incremental scrubbing in communicating compartments is in some cases associated with a novel disposition of distributor head, wherein the latter is disposed above the liquid level in one of the compartments, the wall, partition or a plurality of the same being elevated to assure that the liquid phase constituents of the fog are directed or guided into the compartment, the vapor phase constituents being withdrawn in the usual manner. This step is best practiced by disposing the distributor head above an end compartment, i. e. one having a major wall defined by the wall of the vacuum chamber, permitting continuous incremental scrubbing and in many instances reducing materially the possibility of entrainment of the liquid phase constituents of the fog.

Preferably, the cream is continuously collected in the vacuum chamber, and successive portions thereof are continuously subjected in the vacuum chamber, during the expansion treatment therein to a steam scrubbing accompanied by odor and off-flavor removal. This operation removes additional, i. e., remaining odor and flavor imparting, substances from the cream and is preferably simultaneous and continuous with the forming of the mist or fog by the violent and spontaneous expansion of the cream-steam-water mixture in the vacuum chamber.

In some cases, the scrubbing treatment is carried out in a separate vacuum chamber, the scrubbing with steam being continuous with the expansion treatment in the other vacuum chamber. Again, intermittent batches are (1) scrubbed in a separate chamber; or (2) are scrubbed in the same vacuum chamber upon completion of the expansion treatment therein.

The advantage of having the scrubbing substantially immediately follow or be continuous with the expansion treatment in any of the processes described resides in the saving effected, in that the cream will be at a temperature such that reheating thereof is unnecessary as a preliminary to scrubbing.

This scrubbing takes place upon the cream while the latter is at its boiling point under the condition of vacuum being maintained. The live steam at high temperature and pressure, e. g. around 325° F. and eighty pounds gauge, is injected into the mass of cream at the bottom thereof and immediately expands, sweeping through the cream and mechanically removing objectionable odor and flavor imparting substances. No substantial evaporation of the cream takes place and the effect therefore is one wherein the steam agitates and passes through the cream without appreciably raising the temperature of the cream, but at the same time, releases and carries off the undesired substances.

A primary object of this invention is to provide means for pasteurizing a fluid such as cream at temperatures considerably higher than those conventionally used and without detrimental effect upon the final product. This is made possible by the rapid heating and instantaneous cooling to which the lactic fluid is subjected whereby pasteurizing temperatures of substantially 200 to 250° F. or higher may be safely employed. In other words, in conventional operations the temperatures of pasteurization must be below the boiling point of the lactic fluid being treated at normal atmospheric pressure, whereas, with the present invention, this limitation does not obtain.

By rapid heating is meant the heating of a continuously flowing mass travelling at a speed of the order of substantially three to five pounds (about ½ gallon) per second past a given point under the high temperatures recited and under a pressure of substantially ten pounds gauge and higher.

In referring to instantaneous cooling, we mean spontaneous cooling obtained by suddenly releasing the pressure on the heated fluid in the conduit, e. g., by introduction of the fluid into a vacuum chamber, whence it assumes, by reason of the cooperation of a distributing head having a restricted outlet, a finely divided or mist-like condition and undergoes a sharp and immediate reduction in temperature induced by the reduced pressure in the vacuum chamber.

This combination of steps in a continuous operation, of rapid heating and instantaneous cooling with reduction of the fluid to a fog-like state, (thereby exposing maximum surface for cooling) permits utilization of high temperatures within the sterilization range and without detrimental effects on the organoleptic and physical characteristics of the final product.

In fact, it has been found that the physical characteristics of the product, e. g., cream, are actually enhanced, whereby the stability of the finally recovered cream emulsion is improved to the extent that separation of the cream into a cream and skim milk layer is prevented. Furthermore, the stability of the recovered cream emulsion, i. e., the final product, is such as to minimize, and in most instances eliminate, the so-called feathering of cream when used in coffee or other hot beverage. This enhanced stabilizing effect is also valuable in the processing of ice cream mix and the pasteurization of milk used in the manufacture of cheese, concentrated milks, fermented milks, and milk powder. The stabilizing effect is so definite that milk powder made from milk thus treated possesses improved properties when used in baking applications. This stabilizing effect is due to the greatly enhanced dispersion of fat globules and the increased viscosity of the milk, resulting from (a) the shattering effect during the preliminary treatment promoting dispersion, and (b) the subsequent spontaneous expansion in the vacuum chamber providing instantaneous cooling.

Another important feature of the invention is to provide effective control of the temperature and pressure conditions and assure that the cream, for example, will be thoroughly pasteurized and rendered in the optimum state for treatment in the vacuum chamber.

The present invention, as will be appreciated, embodies apparatus inclusive of the subject matter of the applications of Herman C. Horneman, Serial No. 654,069, filed January 28, 1933, which has matured into Patent No. 2,022,419, dated Nov. 26, 1935, and Serial No. 681,658, filed July 21, 1933, and applications of Hammer, Horneman and Parker, Serial No. 13,168, filed March 26, 1935 and Serial No. 32,284, filed July 19, 1935, now Patent No. 2,022,420, dated Nov. 26, 1935.

Other objects and novel features and advantages of this invention will be apparent from the following specification and the accompanying drawings.

Referring to the drawings.

In general, the apparatus is similar to that shown and described in the aforesaid Horneman applications, embodying, however, improvements which render the invention more flexible and efficient both as regards the quality of end product recovered and economics of operation.

Figure 1:
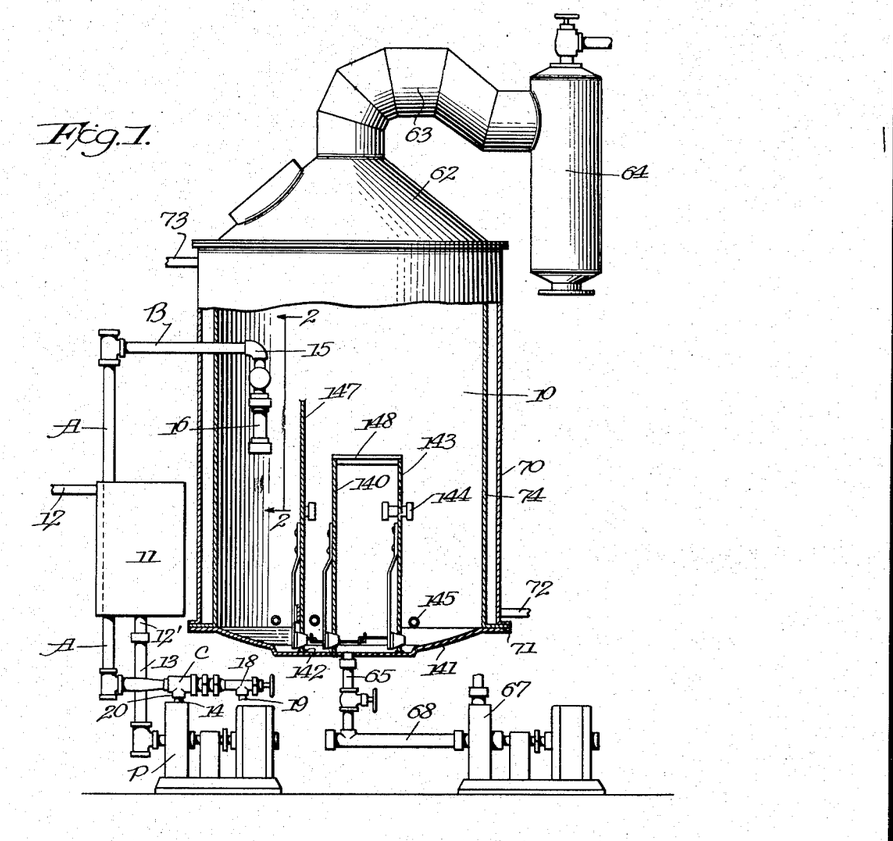
Figure 1 is a view partly in section and partly in elevation of one form of apparatus.
Figures 5, 8:
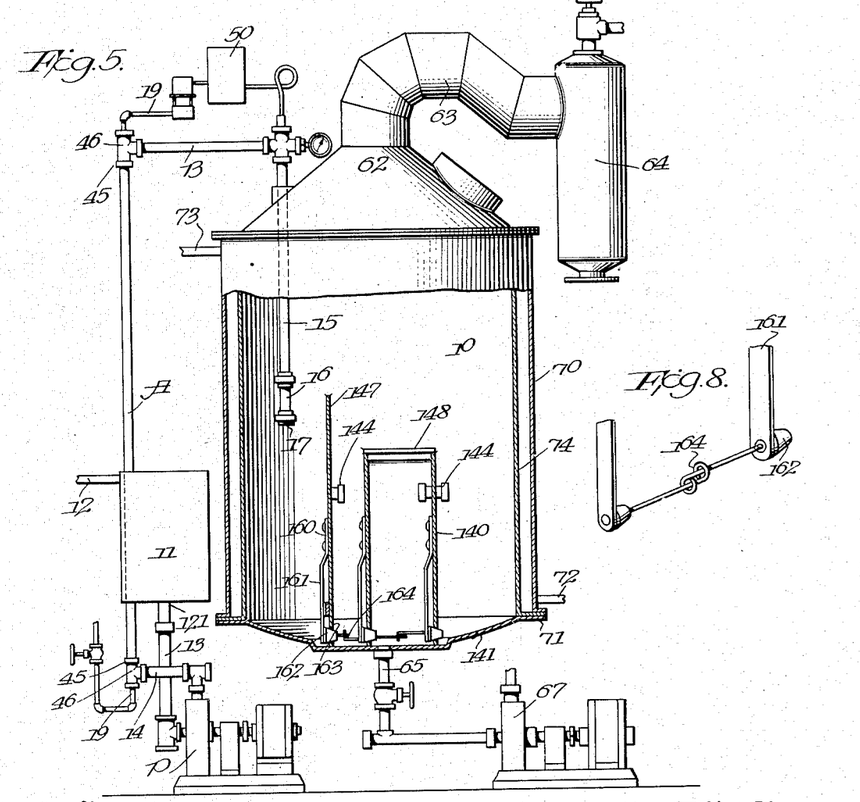
Figure 5 is a sectional view partly in elevation of a further form of apparatus.
Figures 7 and 8 are detail views of the operating means shown in Figures 5 and 6.
Figures 22, 23, 24, 25, 26:
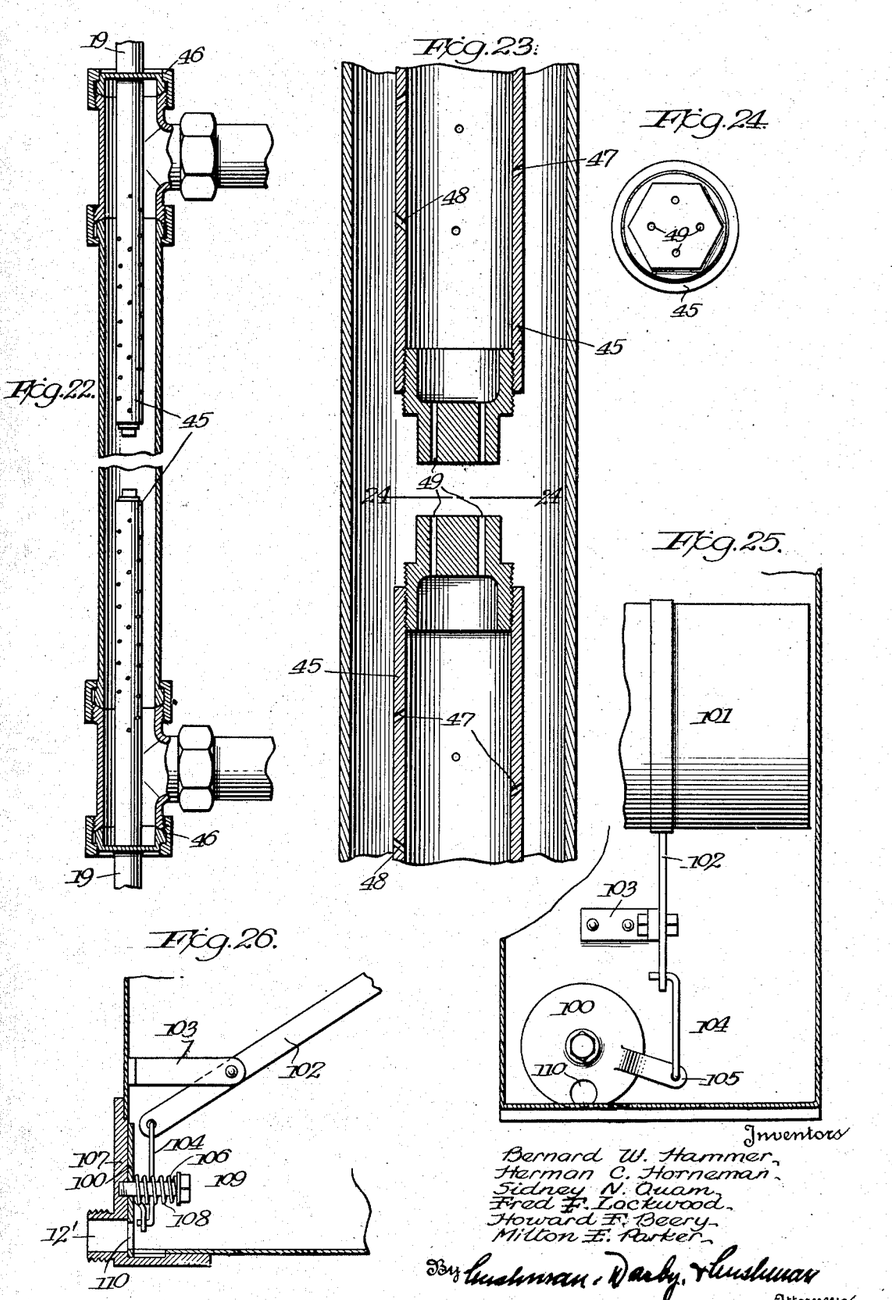
Figure 22 is a detail sectional view of another form of mixing device.
Figure 23 is an enlarged sectional view of the construction shown in Figure 22.
Figure 24 is an end view looking in either direction from the line 24—24 of Figure 23.
Figure 25 is a detail view partly in section of the float chamber or surge tank of Figure 1.
Figure 26 is a detail view partly in section of the valve operating means and valve associated with said surge tank.

In Figures 1, 3, 5, 9, 12 and 19 the numeral 10 represents a closed metal container equipped to operate as a vacuum chamber and also in some cases (Figs. 1, 3, 5 and 9) as a vacuum scrubber or still. This vacuum chamber is preferably heated, as will be later described. The liquid to be treated is introduced into a surge tank 11 through a pipe 12 from a forewarmer or other means where it has been preliminarily heated to a suitable temperature and/or otherwise treated. In some cases, the surge tank 11 is omitted and the liquid or fluid is introduced directly from the treating means such as the forewarmer by any suitable pumping operation. Referring to Figures 25 and 26, the surge tank 11 is provided with a float controlled outlet 12'. The outlet is connected by a pipe 13 to a motor operated pump P, preferably of the positive type, capable of impressing a pressure of 5 to 50 pounds or more on the liquid. The liquid is pumped through the pipe or connection 14 to a line comprising pipes or conduits A—B, suitably connected, and from the conduit B is introduced into the vacuum chamber 10 by the communicating pipe or connection 15 having a distributor head 16 of any of the forms shown herein, preferably that shown in Figures 13 and 15, and provided with a reduced outlet 17, as shown in detail in Figures 11, 13 and 16. Referring to Figures 17 to 24, a steam injection device C or C' shown in detail in Figure 17 or 18 is interposed between the pump P, pipe 14 and the pipe or conduit A, as shown for example in Figure 1 and in more enlarged detail in Figure 19; in Figures 22, 23 and 24 another type of steam injection device D, or an injection device as provided in said Horneman applications, is suitably connected in the line A, in any preferred manner. If desired, the two devices C or C' and D may be combined. In such event, the steam injection means D is used for forewarming the cream supplied to the surge tank 11, being interposed in the line 12, and the usual forewarmer, e. g., flash pasteurizer or barrel heater, omitted. Either of the steam injection means C or D or both are used in association with each of the apparatus shown in Figure 1. This, briefly, describes the general system employed and details of the apparatus will be further elucidated. As heretofore stated, the use of a surge tank is optional in many cases, since the fluid may be directly pumped to the line A—B and/or through the steam injection devices as shown in Figures 1 and 5 and illustrated best in Figures 19 and 22.

The invention is useful for treating a large variety of liquids, and finds particular utility in the case of lactic fluids such as milk and cream. These, as heretofore stated, often possess objectionable odors and off-flavors, and the invention will be exemplified in the removal from cream of substances imparting such undesired characteristics.

Generally stated, the cream is (a) pasteurized within a sterilization range while travelling in the line A—B and/or pipe 15 by reason of live steam which is preferably introduced at proper pressure and temperature; (b) the cream particles are torn apart by agitation and impact with the steam and this shattering action, which takes place while the cream is moving from the pump to the vacuum chamber, releases the off-flavor and odoriferous substances and/or renders them potentially releasable; (c) the cream-steam-water mixture is discharged through the reduced outlet of the distributor head 16 and spontaneously with explosive force expanded to a mist or fog-like state; (d) a heated vacuum chamber is employed whereby condensation of vapor phase constituents is prevented and separation of liquid and vapor phase constituents is prolonged; and (e) maximum subdivision of the cream particles is obtained in the vacuum chamber enabling substantially complete removal of the odoriferous and off-flavor imparting volatiles. The very effective results are made possible (1) by the efficiency of the preliminary subdivision of the cream while travelling to the vacuum chamber and (2) by the cooperation of the vacuum treatment, whereby the cream is substantially denuded of undesired volatiles, or by simple and inexpensive subsequent treatment rendered so.

Stated briefly, the cream, while travelling in the line A—B or A—B—15, is compressed, due to the cooperation (a) of the heating effects, (b) of the pump P at one end and (c) the restricted outlet in the distributor head 16 at the other end of the system, and (d) the steam at high pressure and temperature which is introduced into the cream initially and, in some cases, into the cream-steam-water mixture at the distributor head and also cooperating with said restricted outlet; thereafter the cream-steam-water mixture is violently expanded in the vacuum chamber. In the case of the steam injector devices shown in Figures 17 and 18 in detail and, for example, in Figure 19, the cream is warmed or heated in the Venturi device and compressed between the pump at one end and the restricted Venturi port at the other, then projected through the port at high velocity as a thin stream or cone into contact with an intersecting thin jet or cone of live steam at high velocity, with accompanying decrease in pressure, and the cream-steam-water mixture is expanded in the gradually enlarging Venturi outlet; thereafter the mixture fills the line A as a liquid column and is under the pressure created by the heating effect, the pump, distributor head and steam pressure, as above described. The venturi device of Figure 18 is provided with a channel for circulating water to cool and/or control the temperature of the fluid passing therethrough.

The heating of the continuously travelling cream, in addition to accomplishing pasteurizing or sterilizing, also acts to agitate the cream whereby the cream particles are shattered and torn, and the released objectionable substances are volatilized and retained in this condition so that they are readily removable in the vacuum chamber as vapor phase constituents. At the same time, the breaking up of cream particles assures uniform and minute subdivision and uniform heating for pasteurizing and sterilizing; of equal importance and, in fact, of particular significance, where the odor or off-flavor imparting substances are tenacious and/or excessive, this preliminary and intimate subdivision renders such stubborn substances potentially releasable, i. e., readily removable as vapor phase constituents by the vacuum chamber treatment or by a simple and inexpensive further treatment as will be later set forth.

Figures 17, 18, 19, 20, 21:
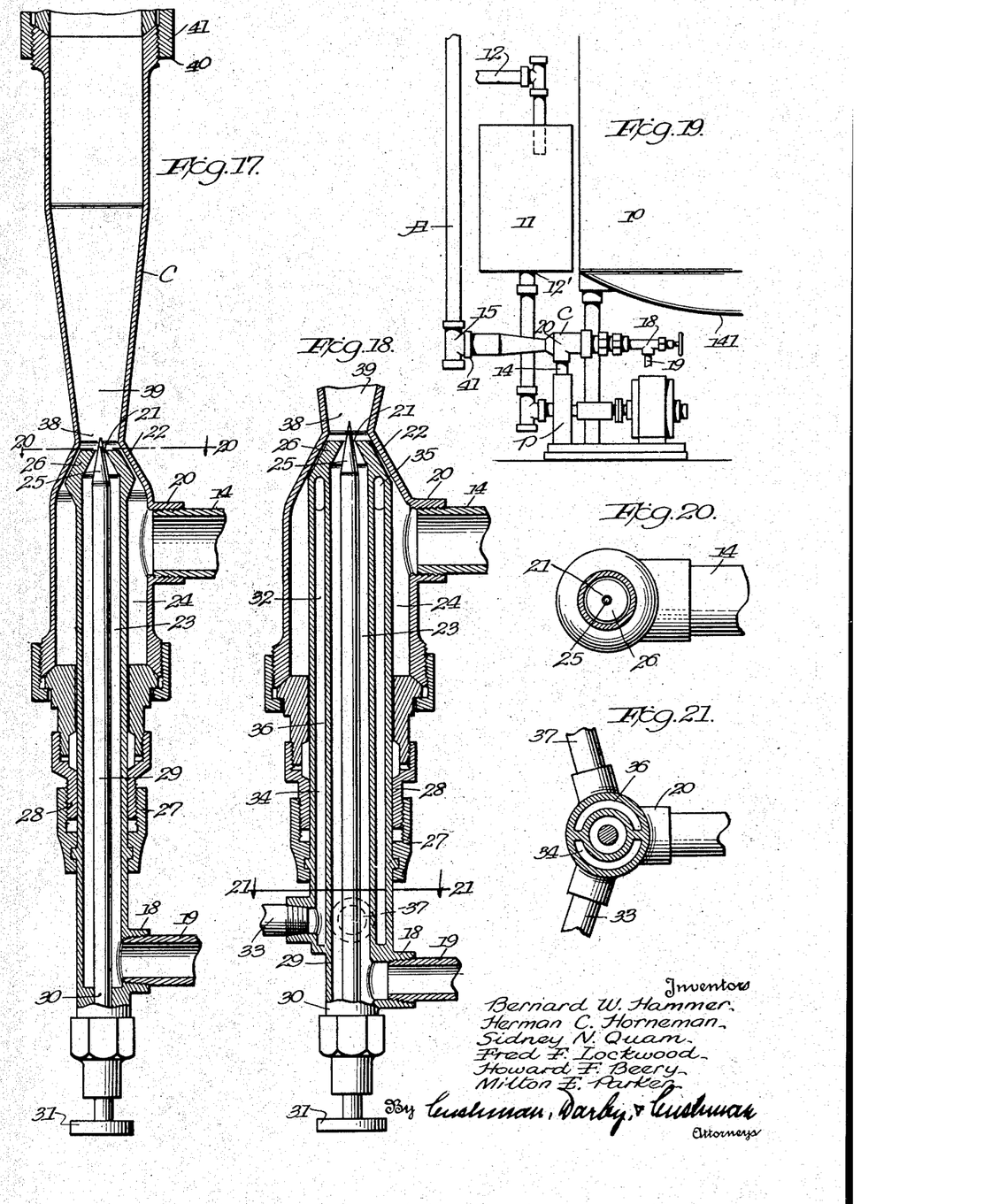
Figure 17 is a sectional view of a Venturi mixing device.
Figure 18 is a similar sectional view of another form of Venturi mixing device.
Figure 19 is a view in elevation partly broken away showing the mixing device in position on the installation of any of the apparatus heretofore mentioned.
Figure 20 is an end view of the Venturi mixer of Figures 17 and 18.
Figure 21 is a section on the line 21—21 of Figure 18.

Referring to Figures 17, 18 and 19, for example, the steam injection means C or C' has a steam inlet 18 communicating with a steam line 19 and a fluid inlet 19 communicating with the outlet pipe 14 of the pump P. This steam injection means has the form of a venturi, but any suitable construction capable of producing warming or cooling or controlling the temperature of the cream and compression of the cream, intersecting thin streams of cream and steam at high velocity, and expansion of the cream-steam-water mixture followed by a return of pressure on the mixture may be used.

The Venturi device C has a pair of outlet ports 21 and 22, respectively, communicating with the steam and fluid chambers 23 and 24 respectively supplied by the inlets 18 and 20, and which ports 21, 22 are restricted and controlled by the adjustable valves 25 and 26, respectively. The valve 26 is regulated by engagement of the nut 27 with the threaded sleeve 28; the valve 25 is carried on a stem 29 having adjustable threaded connection with a bushing 30 and the stem is provided with a handle 31 for regulating the adjustment. The ports 21, 22 are continuous, concentric and preferably circular, and the size of the openings is minutely controlled by regulating the valves 25, 26, as described. The venturi C' is similar to the venturi C, but in addition the valve 26 has a closed channel 32 therein substantially throughout its length, water, gases or other cooling medium entering the same through inlet 33 and up one leg 34 of the channel 32 across the passage 35 at the outlet end of the venturi to the return channel 36 and through the same for discharge at outlet 37. By means of a circulating medium control of the temperature of the cream and prevention of burning is obtained.

The steam port 21 is defined by inwardly directed closely spaced sides, one having greater inclination than the other and forming a tapering restricted continuous opening whereby the steam supplied at a gauge pressure of eighty to one hundred pounds, i. e., 325 to 340° F. to chamber 23 is ejected substantially in the shape of a cone or fine stream at high velocity into the constricted portion 38 of the venturi and the adjacent enlarged portion 39 thereof. The outlet port 22 for the cream is defined by parallel, continuous, inwardly directed sides closely spaced, i. e., forming a restricted outlet, whereby the cream introduced to the chamber 24 under a pumping pressure and compressed by cooperation of the pump with the restricted outlet port 22, is broken up and similarly discharged substantially as a cone or fine stream at high velocity with the assistance of the aspirating effect created by the steam jet, and intersects the stream or cone of high velocity steam. The thin intersecting streams of steam and cream ejected at high velocity create in the gradually enlarging or tapering side 39 of the venturi a condition or zone of reduced pressure. This tapering portion 39 at its widest diameter merges into or is connected into communicating relation with the line A, as shown at 40 by a threaded collar 41. Referring to Figure 17, the cream in chamber 24 is subjected to a heating by contact with the heated wall of the steam chamber 23, whereas in Figure 18, the cooling liquid forms an insulation to prevent heating or undue heating of the cream and controls its temperature.

There takes place in the treatment just described (a) compression and, if desired, heating of the cream, (b) a tearing apart of the cream particles by reason of the bombardment of the steam and cream, (c) an expansion of the cream-steam-water mixture thus produced, resulting in further and more intimate subdivision in the zone defined by the tapering portion 39, and then (d) compression of the mixture as it fills the conduit A as a liquid column. Subdivision of the cream is thus very complete and fine, and the odoriferous and off-flavor imparting substances are released or rendered potentially releasable. Initial pasteurization and sterilization also take place and are completed in the line A—B. The heated mixture in the line A—B is agitated and compressed and an intimate mixture of steam with the cream particles is maintained. This agitation and compression continues during travel of the mixture in the line A—B whereby the released volatiles, under conditions prevailing in the line, will be prevented from returning to their former combined state, and the release and potential release of additional undesired substances will occur; also the cream is enhanced so far as rendering potentially releasable the more tenacious substances. This preliminary conditioning of the cream and its pasteurization is aided by the high temperature of the mixture, namely 200 to 250° F. and higher.

While in Figures 1, 3, 5, 9, 12 and 19 the steam injection means is disposed horizontally, it operates with equal facility when disposed in a vertical plane and it is to be understood that either injection device C or C' may be employed.

A feature of this construction of particular importance resides in the minimum of control required. For example, the valves 25, 26 can be set and the steam and cream at predetermined temperatures and pressures and the cooling means as well passed to the injection device C or C', whereupon a constant temperature will be maintained, with uniform heating, cooling and/or temperature control and subdivision of the cream.

A greater subdivision is, moreover, obtained in the vacuum chamber 10 by reason of the fine subdivision resulting from this preconditioning. The restricted outlets 17 in any of the distributor heads 16 may, in some instances, be adjusted very critically (as low as ten one-thousandths of an inch for the head shown in Figure 11 (.010")) without retarding the speed of operation. At the same time, the most tenacious and stubborn odoriferous and off-flavor substances are removed. As to the latter element of speed, the high velocity treatment speeds up the flow and, moreover, prevents clogging or coating of the injection device or the line, since uniform heating takes place and little or no opportunity is presented for precipitation of curd which would tend to collect in the line were there any uneven heating or overheating. The distributor heads shown in Figures 13 and 15 are not only efficient in promoting subdivision of the mixture, but enable an accelerated speed of operation to be obtained.

The subdivision of the cream by using the injection device C in cooperation with line A—B—15 and associated devices is very effective and efficient so far as pasteurizing, and release or potential release of volatiles, is concerned, because of the initial bombardment of a thin continuous high velocity stream of cream with a similar stream of steam and followed by (1) expansion and (2) compression, since there actually takes place a treatment of a small body of cream with a large body of steam.

As illustrating another form of injection device and referring to Figures 22, 23, 24 and 5, nozzles 45 connected to the steam line 19 are introduced through fluid-tight fittings into the upper and lower ends of the conduit A as shown at 46, and to heat the fluid in the line to a pasteurizing or sterilizing temperature. For example, an inert gas such as steam at eighty to one hundred pounds gauge pressure and at a temperature of approximately 325 to 340° F. is injected into the fluid in the conduit A, through the nozzles 45.

The nozzles 45 are disposed in spaced relation in the conduit A and extend toward one another as shown. Each nozzle is provided with a plurality of narrow or small diameter spirally arranged spaced ports about ($\frac{1}{16}$") inclined at substantially 30°. The ports 47 open upwardly, i. e., inject the steam in the direction of travel of the cream flow; the ports 48 open downwardly, while the opposed longitudinal ports 49 of the respective nozzles inject the steam parallel to and reversely of the cream flow. In this manner, a turbulence and whirling of the fluid is obtained, assuring intimate mixing and uniform heating of the fluid, and compression of the cream-steam-water mixture because of the pressure created (1) by the heating effects, (2) by the steam in cooperation with the pressure created by (3) the restricted outlet in the distributor head at one end of the line and the pumping pressure at the other end. A very complete subdivision of the particles in the case of milk and cream with resultant enhanced release and potential release of volatiles and odoriferous substances therefore is obtained.

The ports 47 preferably number about twenty while the ports 48 number about twelve and the ports 49 about four. This ratio may be departed from as desired, but it is preferable that the ports 47 injecting steam in the direction of cream flow predominate. The ports may be formed throughout the length of the nozzles or only partially as shown.

In operating the apparatus at a gauge pressure of approximately 10–15 pounds in the line A—B, the fluid, when it reaches the vicinity of the upper nozzle, has a temperature of substantially 190 to 205° F. and this is raised to about 210 to 230° F. by the steam treatment at this point. The temperature of the cream-steam-water mixture will be controlled through the medium of this upper nozzle. For example, it has been found with a vacuum of twenty-four inches to twenty-six inches in the chamber 10, that a gauge pressure of about ten to fifteen pounds and temperatures of 210 to 230° F. for the cream-steam-water mixture in the line A—B will produce very satisfactory results. Therefore, we associate with the upper nozzle a thermostatic control indicated as a whole at 50 as shown in Figure 5 to regulate the steam injected and by consequence adjust the temperature of the cream-steam-water mixture and, as shown, and described precisely in Figure 5 of the Hammer-Horneman-Parker applications above referred to.

In the use of the ejector D, very satisfactory pasteurization and subdivision of the cream particles is accomplished in line A—B by injecting live steam under pressure through the spaced ports 47, 48, 49 of the nozzles 45 in the form of needle-like jets and into the cream. This produces a multiplicity of impacts or impingements by the steam on the column of cream travelling in the line A—B whereby mixing of the steam and cream takes place in a manner to agitate and thoroughly comb the steam with cream. Due to the spacing and angular disposition of the ports, a turbulence and whirling in the direction of travel is imparted to the cream-steam-water mixture. Substantially similar effects and results are obtained as with the injector device C or C', but the latter gives more positive control and is more effective.

Figure 9:
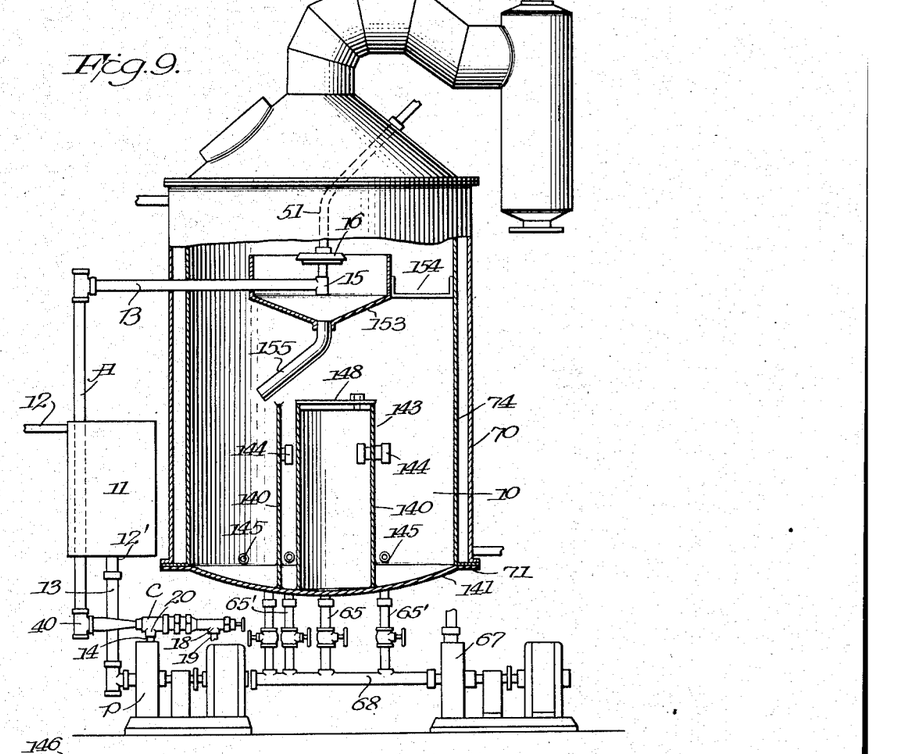
Figure 9 is a view partly in section and partly in elevation showing an additional form of apparatus.
Figure 11:
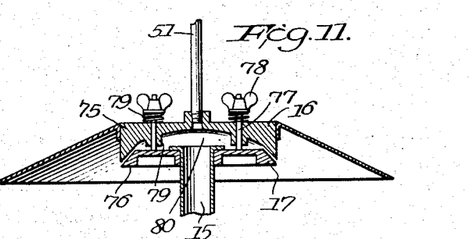
Figure 11 is a detail sectional view of a distributor head in accordance with the aforesaid Horneman and Hammer et al. applications and particularly showing the distributor head of Figure 9.
Figures 12, 13, 14, 15, 16:
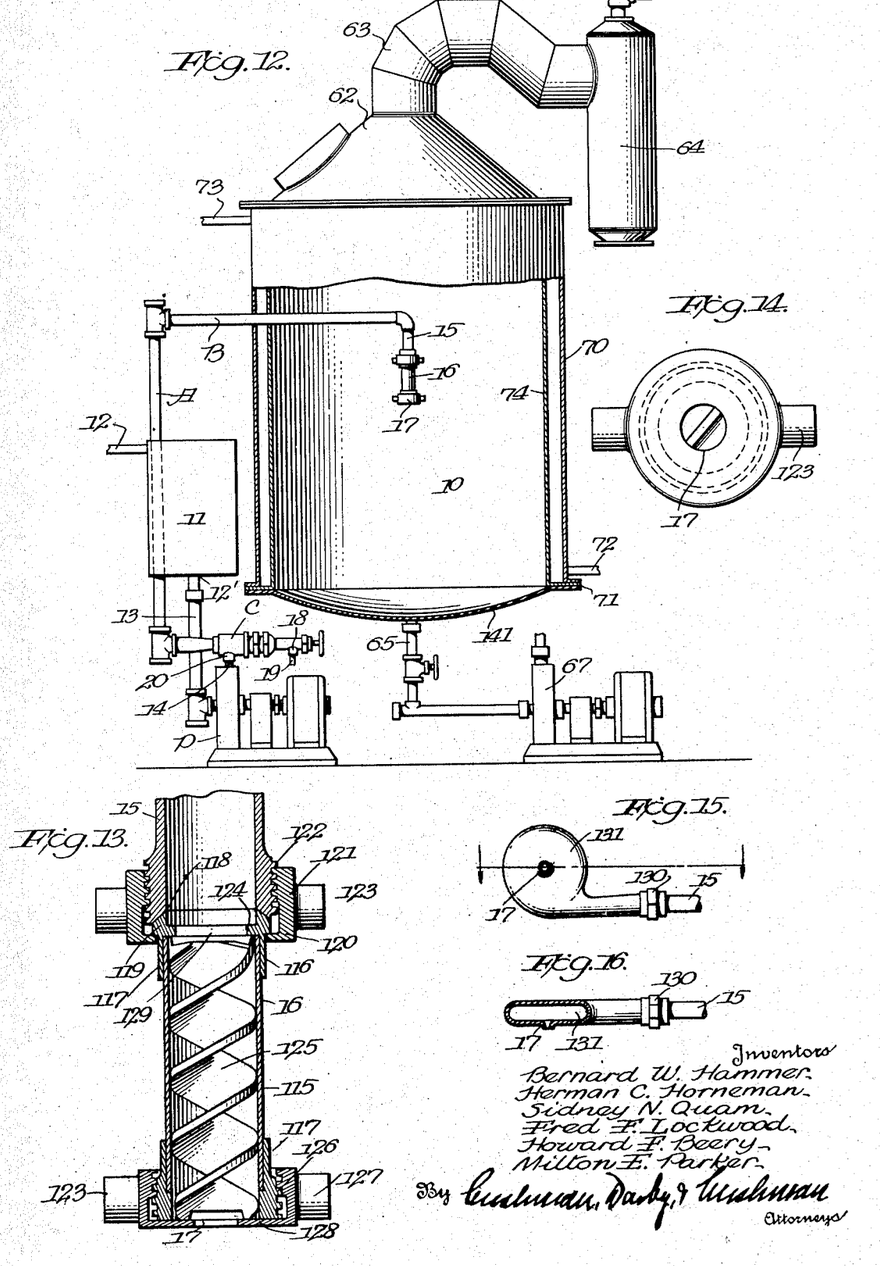
Figure 12 is a view partly in section and partly in elevation of a further form of apparatus.
Figure 13 is a sectional detail view of another type of distributor head.
Figure 14 is a bottom elevation of the distributor head shown in Figure 13.
Figure 15 is a side elevation of another type of distributor head.
Figure 16 is a sectional view of the distributor head of Figure 15.

Referring to Figure 9, I have shown connected with the distributor head 16, for example that of Figure 11, a steam line 51, the purpose of which is to increase the compression of the cream-steam-water mixture in the line A—B or at a suitable point just prior to its introduction into the vacuum chamber. It is preferable to have the steam line 51 connected into the distributor head immediately at the distributor head, but, of course, in some cases, the auxiliary line 51 may be connected at a suitable point in advance of the head. Live steam under a suitable temperature, such as 325 to 340° F. and pressure of 80 to 100 pounds gauge is used and, in some cases, the purpose of this steam treatment is to increase the temperature of the mixture preliminary to expansion in the vacuum chamber.

It is to be understood that the auxiliary line 51 is used in association with any of the apparatus here illustrated and any of the distributor heads disclosed herein, and the showing of the same connected to the distributor head 16 of Figure 11 is purely illustrative. In most cases, however, this auxiliary steam line is unnecessary.

Further with reference to the auxiliary steam line 51, I associate therewith thermostatic means for controlling the steam similar to that shown in Figure 5. That is, the steam valve is controlled by the temperature of the mixture in the line in advance of the distributor head, as shown in Figure 5. Hence, the compression of the mixture at the distributor head can be readily held to the optimum whenever necessary.

In connection with the use of a pump, this, in association with the distributor head 16, and either injection device C, C' or D, increases the effectiveness of the process and the capacity of the apparatus materially. Where the injection device D is employed, or where the auxiliary steam injection means 51 is used, the temperature of the mixture in line A—B—15 is regulated by the thermostat 50. The pressure head in line A—B—15 is adjustable by regulating either the pump or distributor head 16 or both, as well as the several steam injection means. These control features are all available and employed where the injection device C or C' is used, but ordinarily by reason of the relatively finer adjustments afforded through the use of the venturi, no thermostatic control 50 is needed.

Hence, it is possible to exercise a precise control, and the condition of the cream-steam-water mixture, i. e., temperature and pressure, in the line A—B is susceptible of nice regulation at all times, using either injection device to accomplish optimum results. As will be appreciated, this is very important in a continuous process such as comprehended by the present invention, assuring both uniform and complete pasteurization, and subdivision of the cream-steam-water mixture. Stated briefly, the treatment of the fluid in line A—B is maintained substantially constant and the cream is introduced through the distributor head in optimum condition for the instantaneous and explosive expansion, to which it is subjected in the vacuum chamber and a desired pressure differential of about two to five atmospheres more or less is constantly held between the vacuum chamber 10 and the line A—B.

The line A—B, it will be noted, is relatively long and this allows of very complete pasteurization as well as an extended time period of utilizing the compression effects to (1) subdivide the cream and (2) accomplish release and potential release of objectionable substances.

The cream-steam-water mixture in the line A—B is distributed in the vacuum chamber 10 by means of the distributor head 16 which has a narrow, preferably elongated or continuous peripheral, opening 17, as in Figure 11, or a circular opening as in Figures 13 and 15. At the opening 17, the pressure of the cream-steam-water mixture in the line A—B is suddenly released due to the reduced pressure in vacuum chamber 10 and it is expanded with spontaneous and violent force downward into the chamber in substantially a fog or mist-like state. We have found that a pressure differential of substantially two to five atmospheres more or less between the line A—B and the vacuum chamber will produce very excellent results. The vapors and gases released by the expansion of the cream-steam-water mixture in the vacuum chamber 10 through head 16 are carried off through a port 62 and pipe 63 to the condenser 64 and associated with a suitable vacuum pump, not shown. The liquid portions of the cream or milk will coalesce and collect at the bottom of the vacuum chamber 10 and will pass by outlet pipe 65, in Figures 1, 5, 9 and 12, or outlet pipe 66 in Figure 3, to a suitable pump 67, so that the coalesced liquid can be continuously removed through a pipe 68, or removed in batches to a suitable cooler where required.

Referring to Figures 1, 3, 5 and 9, in some cases where excessive concentration of objectionable substances are present or they are tenacious, the coalesced liquid having a temperature of substantially 130° F. to 145° F. is subjected to a steam scrubbing treatment, as will be later described.

Surrounding the vacuum chamber 10 is a spaced wall 70 suitably connected to the wall of the vacuum chamber as by welding at each end, as shown at 71, and constituting a jacket which is heated electrically or within which is circulated a heating medium either of gas or liquid but preferably hot water. The temperature of the heating jacket should be about twenty degrees above the temperature in the vacuum chamber and under conditions of twenty-four to twenty-six inches of pressure in the chamber 10, the inner wall of chamber 9 should have an approximate temperature of 165° F. to 150° F. The inlet and outlet for the circulating medium are indicated at 72 and 73, respectively.

The heating jacket 70 assures that the inner wall surface of the chamber 10 will be at a constant temperature and serves to reduce to a minimum the possibility of condensation of water vapors and gases on the wall, as well as produce a prolonged separation of vapors and odoriferous and off-flavor gases from the liquid phase particles. This heating jacket 70 serves to maintain the wall of the chamber 10 at all times heated to the temperature above the boiling point of the cream, according to the conditions of vacuum in the chamber 10. As heretofore stated, a temperature at least twenty degrees above that of the chamber 10 should be present in the jacket 70 for maintaining the wall at elevated temperatures.

Thus, a heated vacuum chamber is employed, the heating means being constituted by the jacket 70 and by the steam scrubbing, as will be later described. In some cases, the jacket 70 may be omitted as where steam scrubbing is resorted to, but its use is preferred.

Referring to Figure 11, the distributor head comprises a body 75 and valve 76 adjustably connected by bolts 77 to vary the width of the spray outlet 17. The bolts are provided with wing nuts 78 engaging springs 79 disposed between each wing nut and the adjacent top surface of the body 75. Interiorly of the member 75 are projections 79 through which the bolts extend and which projections are of equal length and of a size whereby suitable shims may be interposed between the bottom of the projections and the top surface of the valve 76, thereby affording an extremely fine and critical range of adjustment for the outlet opening 17. The valve 76 has an opening receiving the end of line 15, the end of the line being flanged and soldered to the valve as shown. Also, as shown, the auxiliary steam line 51 is threadedly connected into the top of the body portion 75 for delivering steam to the chamber 80 simultaneously with the discharge of the mixture from line 15, whereby enhanced compression is attained.

Referring to Figure 13, we have illustrated a preferred type of distributor head 16. This head is connected to the pipe 15 of the line A—B as shown in Figures 1 or 12, for example, and comprises a barrel 115 having secured at each end, as by welding or swaging, a connection 117. The connection 117 at the upper end is beveled as at 118 to engage the beveled surface of the pipe 115 and is provided with a flange 119 with which is engaged, the flange portion 120 of an internally threaded connecting nut 121 engaging threads 122 on the end of the pipe 15 to bring the beveled surfaces of the connection 117 and pipe 15 into connected relation and maintain a firm leakproof joint. The nut 121 is provided with projections 123 for manual turning purposes. The connection 117 has an internal circular projection 124 between which and the opposite end of the distributor head is clamped a spiral member 125. That is to say, the lower connection 117 is externally threaded as at 126 to receive an internally threaded nut 127 whose bottom 128 engages the other end of the spiral member 125 to clamp the same in position and is provided with the restricted outlet 17. Suitable projections 123 are formed on the nut 127 for manual turning in purposes. It is found that by passing the cream-steam-water mixture from pipe 15 through opening 129 in the upper connection 117 and causing it to follow an obstructed path, for example a helical one, that a very excellent breaking up and subdivision and hence separation and removal of odoriferous substances from the fog is obtained.

In Figures 15 and 16, we have illustrated another type of distributor head which is preferably disposed horizontally, as shown in Figure 16, and connected to the pipe 15 by any suitable connection 130. This distributor head is in the form of a substantially circular hollow casing 131 having the distributor outlet 17 disposed substantially centrally in the bottom thereof. This distributor head likewise gives very excellent results and produces a more complete subdivision whereby separation and removal of odoriferous substances is enhanced.

Figure 2:
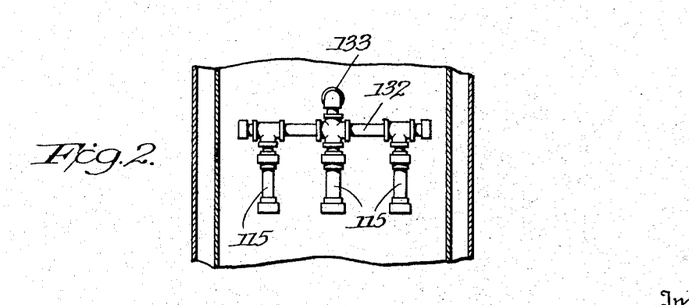
Figure 2 is a section on the line 2—2 of Figure 1.

Referring to Figure 2, we have illustrated a header 132 connected to the pipe 15 by a connection 133 to which header is suitably connected any suitable number of the distributor heads shown in Figure 11, Figure 13 or Figure 15. In the case of the distributor head shown in Figure 15, it is connected to lie in a horizontal plane so that the opening 17 will project the fog downwardly.

The distributor head opening 17, in any case, is relatively small as compared to the size of the vacuum chamber 10, as shown. It is preferably substantially centrally located in constructions shown in Figures 3, 9 and 12, and in all cases, sufficiently below the outlet port 62 in the chamber 10 to prevent entrainment and far enough from the bottom of the chamber or the liquid level therein to give the falling particles projected from the head a sufficient time for adequate separation out of the vapor and liquid phase constituents and cooling of the latter.

The line A—B and/or line 15 is of a length and diameter to enable the lactic fluid to be continuously pumped to the head 16 and, as stated, during this travel the lactic fluid is simultaneously pasteurized and intimately mixed with the steam to be compressed, broken up and subdivided under the conditions created in the line A—B.

Referring to Figures 25 and 26, the outlet 12' of the surge tank is controlled by a float actuated valve 100. The mechanism for operating this valve includes the float 101 having connected thereto an operating rod 102 pivoted on the bracket 103 carried by the wall of the surge tank, the free end of the rod 102 engaging the link 104 which, in turn, is freely connected to a lug 105 carried by the valve 100. The valve 100 is rotatably mounted on a bolt or stud 106 mounted in an extension 107 of the outlet 12' and a spring 108 is interposed between the head 109 of the stud and the inside wall of the valve 100 for maintaining the valve flush with the inside of wall 107 at all times. The rotary valve has an opening 110 which is in register with the opening in the outlet 12' when the liquid and the float are at a predetermined level. When this level is departed from, the float will act to partially or entirely close the valve until the required level is again reached in the surge tank.

With each of the processes and apparatus heretofore described, the fluid such as cream is pasteurized and subdivided in the line A—B preliminary to its introduction into the vacuum chamber 10. The diameter of the line A—B, the outlet 17 in the head 16, the diameter of the steam inlet, the temperature and pressure of the steam, and the pumping pressure are selected or controlled to produce the required result. In other words, these parts should be so related that the proper pressure differential will be established and that sufficient time will be permitted before the mixture enters the chamber (1) for intimate mixing of the steam and lactic fluid, and fine subdivision of the latter, and (2) for reaching a temperature sufficient for pasteurization or sterilization.

As heretofore stated, and as referred to in said Horneman, Hammer and Parker applications, the coalesced cream is sometimes given a steam scrubbing treatment where the objectionable odoriferous substances are in excessive concentration or exhibit persistent tenaciousness.

Figure 10:
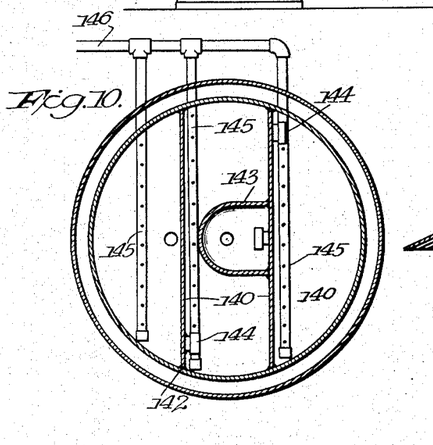
Figure 10 is a section on the line 10—10 of Figure 9.

In the apparatus shown in Figures 1 and 5, the cream-steam-water mixture is discharged with violent expansion and assumes a fog-like state as heretofore explained. The distributor head 16 is disposed adjacent the inner wall 74 of the vacuum chamber 10 and a single distributor head or a plurality thereof as shown in Figure 2 is so positioned. Referring to Figures 4 and 10, the vacuum chamber 10 is divided into a plurality of compartments defined by partitions 140 which are welded to the bottom 141 of the vacuum chamber and to the walls 74 thereof, or otherwise secured in a fluid-tight manner as shown at 142. The liquid phase constituents collect in one of these compartments, preferably an end compartment, as shown. A central outlet compartment defined by the U-shaped partition 143 has its lower edge and ends welded or otherwise secured to one of the partitions 140, as shown at 144. The partitions 140—143 are provided with overflow outlets or liquid level outlets 144 whereby a constant liquid level is maintained in the compartments while, at the same time, continuous flow is permitted from the one compartment in which the liquid phase constituents collect to the others and to the central compartment through the outlets 144. It will be noted that the outlets 144 are in staggered relation whereby the fluid has a serpentine flow successively through the several compartments to the central compartment. In Figures 1, 5 and 9, fluid passes from the vacuum chamber 10 through the outlet 65 communicating with the bottom of the central outlet compartment defined by the partition 143. In Figure 1, and in Figure 5, the outlet 65 constitutes not only the means for removing the coalesced liquid from the vacuum chamber 10, but also constitutes the drain outlet for the vacuum chamber. In Figure 9, an outlet 65' is provided for each compartment and communicates with the line 68 for draining purposes in cooperation with the outlet 65 of the central compartment.

Disposed in the bottom of each compartment except the central outlet compartment is a perforated steam pipe 145 suitably connected to a header 146 from the steam supply. Live steam at a suitable temperature and pressure for scrubbing the incremental portions of coalesced cream continuously flowing in a serpentine direction through the compartments is introduced through the perforated pipes 145 and these have a sufficient number of openings whereby the steam imparts an agitation and turbulence to and exerts a sweeping effect upon the cream portions undergoing the steam scrubbing treatment in the vacuum chamber. In this manner, odoriferous substances are swept from the liquid and removed through the outlet 62.

The outlets 144 are disposed at a level such that flow of cream from one compartment to the other will take place continuously and the height of each partition 140—143 above each outlet 144 is such that foaming-over is avoided. In this connection, and referring to Figures 1 and 5, the adjacent partition 140 defining with the wall of the vacuum chamber 10 an end compartment in which the distributor head is disposed, is elevated as shown at 147, so as to extend above the outlet 17 of the distributor head, whereby the coalesced liquid phase particles are directed into the compartment while the vapor phase particles are withdrawn in the usual manner and removed through outlet 62 and pipe 63 to condenser 64. Thus entrainment of liquid phase constituents is prevented while removal of vapor phase constituents is effectively obtained. This construction, whereby the distributor head is positioned at one of the end compartments, is preferred, but it may be disposed in any one of the other compartments, the walls of which will be elevated as shown at 147. Preferably the liquid phase constituents are continuously collected in one compartment and then pass while undergoing steam scrubbing in continuous serpentine flow to the central outlet compartment and simultaneous with the production of the fog and separation of liquid and vapor phase constituents. The central compartment as shown in Figures 1, 5 and 9 is preferably provided with a removable cover 148.

Figure 3:
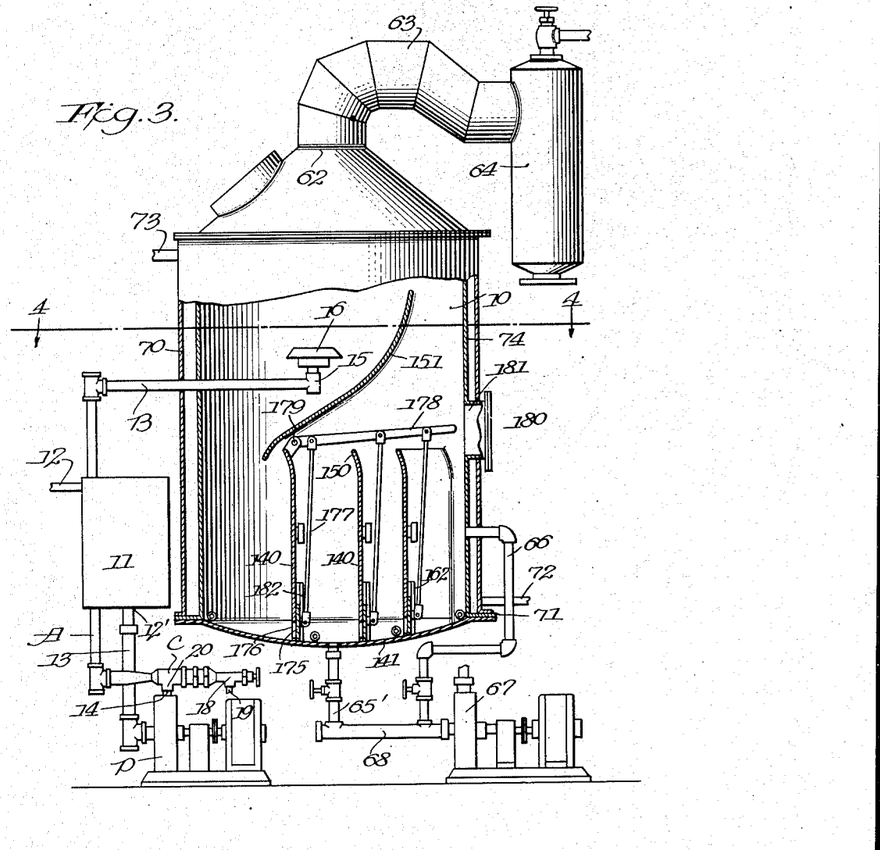
Figure 3 is a sectional view partly in elevation showing another form of apparatus.
Figure 4:
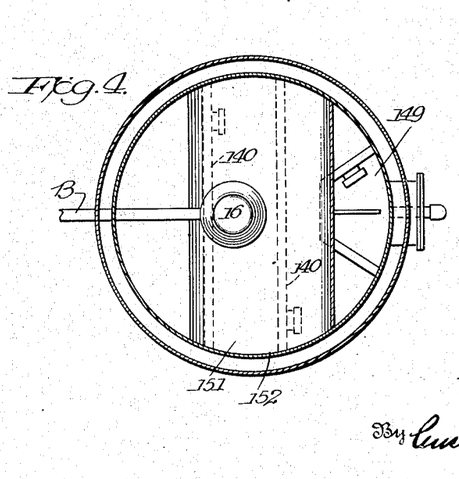
Figure 4 is a sectional view on the line 4—4 of Figure 3.

In Figures 3 and 4, we have shown a construction wherein the partitions 140 extend in parallel chordal relation, with the liquid level outlets 144 disposed in staggered relation and wherein one end compartment 149 constituting the outlet compartment is relatively smaller than the other compartments and has communication with the fluid outlet pipe 66, which leads to the line 68. In this construction a single drain 65' is employed. If desired, the distributor head 16 may be positioned in the construction shown in Figure 3, in one end compartment thereof, as shown in Figure 1, or in a central compartment in which the partition walls are elevated as at 147. It is to be noted that the partitions in the construction shown in Figure 3 are flared as shown at 150 or bent over, so as to divert any foam back into the mass portion under treatment. A similar flaring of the partitions shown in Figures 1, 5 and 9 may be employed wherever necessary.

While we have described a continuous serpentine flow of the fluid and its incremental steam scrubbing treatment while in continuous flow, it is to be understood that the outlets 144 may be arranged in alignment, although this is not preferred.

In Figure 3, the distributor head 16 is centrally disposed and is associated with an inclined baffle 151 which directs the coalesced cream from the fog into an end compartment. This inclined baffle is welded or otherwise secured to the wall of the vacuum chamber, as shown at 152.

In Figure 9, the distributor head is centrally disposed within a receiving member 153 of generally cup-shaped form secured by brackets 154 to the wall of the vacuum chamber 10. The receiving member has an inclined bottom terminating in a pipe 155, whereby the coalesced liquid is directed to one of the compartments, preferably an end compartment.

Referring to Figures 1 and 5, it is to be observed that the vacuum chamber has a generally concave bottom and that a single combined liquid removing outlet and drain pipe 65 is provided at the lowermost point of the bottom. It will be appreciated that the vacuum chamber is of necessity drained and cleaned at frequent intervals and in order that a single pipe may be used, we provide means for rendering the several compartments communicative at the bottom thereof. In Figures 1 and 3 there is secured to each partition wall as by riveting or welding, as shown at 160, a spring metal strip 161 having at its lower end a valve 162 normally engaging in and sealing an opening 163 in the lower end of each partition. The valves are interconnected by means of loose links 164 as in Figure 8. Means for opening all of the valves simultaneously is desirable and we provide for this purpose a rod 166 mounted for sliding movement in a thoroughly sealed stuffing box 167 on the wall of the vacuum chamber with which rod 166 is rigidly connected a flat rod 168 carrying a cam 169 for engaging the metal valve strips to unseat the valves. The rod 168 is slidably mounted in suitable guides 170 connected to the partition, as shown in Figure 7. One spring metal strip 161, where it is engaged by the cam has secured to it as by rivets, a shoe 171 and upon reference to Figure 6, it will be noted that when the handle 172 connected to the end of rod 166 is moved in, the cam 169 will engage the shoe 171 whereby the valves 162 will each be moved laterally out of the openings, so that the several compartments are in communication, and any liquid in the compartments will run into the central outlet compartment and be drained through the pipe 65. When the handle is retracted the valves are again reseated by the spring bands 160 to normal position.

A similar construction is utilized in connection with the apparatus shown in Figure 9.

Referring to Figure 3, a multiplicity of slide valves 175 normally close openings 176 in the lower ends of the compartment walls and these slide valves are pivotally connected to levers 177 which, in turn, are pivotally connected to a single lever 178, which latter is pivotally mounted at one end in a bracket 179. The other end of the lever 178 constitutes a handle and when it is desired to drain the vacuum chamber, the closure 180 for the opening 181 therein is removed and the lever 178 operated to lift the valves which slide in suitable guides 182 mounted on the partitions.

In Figure 12, we have illustrated a construction wherein the distributor head is centrally disposed, and in this apparatus it is preferable to use a distributor head of the type shown in Figures 11, 13 and 15. While it is preferred to use a single distributor head in this apparatus and to associate the same with a Venturi injection means C or C', it is to be understood that other types of injection means may be used as well as a battery of distributor heads as shown in Figure 2.

Likewise, and referring to Figure 9, the supplementary steam supply pipe may be associated with any of the distributor heads such as those shown in Figures 11, 13 and 15 in each of the apparatus structures illustrated.

Figure 6:
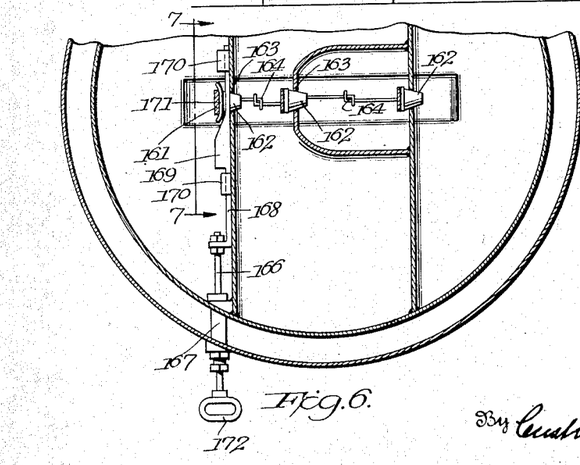
Figure 6 is a sectional view on the line 6—6 of Figure 5.
Figure 7:
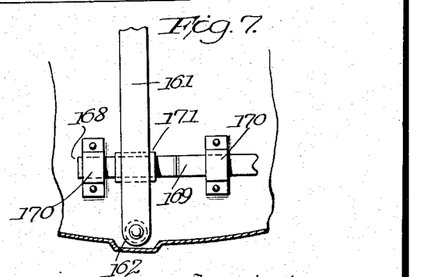

Either of the valve operating structures for permitting communication of the compartments with each other at the bottom thereof for draining purposes may be utilized in any of the constructions shown, although it is preferred to use the construction illustrated in detail in Figure 6.

With the apparatus shown in Figures 1, 3, 5 and 9, successive portions of coalesced cream are given a consecutive steam scrubbing in each compartment. The flow is continuous and serpentine and the treatment simultaneous with, i. e., in the presence of, the fog produced upon the introduction of and expansion of the cream-steam-water mixture in the vacuum chamber 10. The finally treated cream is withdrawn through the central or another outlet compartment by the medium of the pipe 65 or pipe 66 and pump 67 and thereafter suitably cooled. In this connection, control of the flow through the compartments is provided for by regulating the quantity of cream-steam-water mixture introduced to the vacuum chamber through the distributor head 16.

The apparatus of Figures 1 and 2 involves using a single vacuum chamber for accomplishing simultaneous and continuous (1) introduction of the cream-steam-water mixture into the vacuum chamber and expansion thereof into a fog or mist, (2) steam scrubbing of the collected coalesced cream while travelling in a serpentine path in the presence of the mist, (3) removal of the objectionable vapor phase constituents resulting from each of these operations, and (4) removal of the finally treated cream in a steady stream.

The vacuum chamber 10 is also useful for scrubbing batches of coalesced cream. Thus, the cream is collected in one or more of the compartments to a desired level, whereupon the discharge of the cream-steam-water mixture through the distributor head 16 is stopped and the steam scrubbing means operated.

The simultaneous scrubbing or operation of the batch treatment immediately subsequent to the expansion treatment before the batch has cooled is advantageous in that the coalesced cream is at a temperature sufficiently elevated to render the steam scrubbing immediately effective, thereby making possible a substantial saving in steam.

The temperature of the cream-steam-water mixture in line A—B before introduction into the chamber through the head 16 is substantially 200 to 250° F. or higher. A vacuum of twenty-four to twenty-six inches is normally maintained in the vacuum chamber. The expanded cream drops in temperature at the chamber to a temperature corresponding to its boiling point under the conditions of vacuum being maintained. Under the conditions recited, namely twenty-four to twenty-six inches of vacuum, this temperature normally is reduced to about 145 to 150° F. High pressure live steam is preferably used in the scrubbing means, e. g., eighty to one hundred pounds gauge pressure and each portion in the continuous flow or in batch scrubbed for a varying period, usually short, e. g., five to ten minutes depending on the cream.

A feature of the apparatus resides in the fact that the steam scrubbing treatment is performed under conditions whereby the coalesced cream retains substantially its original form without being appreciably condensed or diluted. The effect of the steam sweeping through the cream is (1) to vaporize to some slight extent and (2) particularly to mechanically remove any remaining small concentrations of odoriferous and off-flavor imparting substances and (3) maintain the temperature of the cream at substantially its boiling point at the prevailing pressure.

The apparatus described is preferred and the treated cream may be used in the manufacture of dairy products, particularly butter and sour cream of enhanced quality.

The results obtained are exemplified in the case of cream used in butter making, where the butter has been found to have a score advantage of from two to three points higher than that obtained by conventional methods.

The steam scrubbing will, in some instances, as will be appreciated, not be necessary to produce a butter of a satisfactory score or quality, the previous operations of the process being sufficient.

As heretofore stated, the cream introduced into the line A—B is continuously under the influence of (a) the heating effects, (b) the pumping pressure of the pump P, (c) the steam pressure impressed upon the fluid by the injector means and for the supplementary ejector 51, and (d) the back pressure created by reason of the restricted outlet 17 in the distributor head 16 cooperating with said pressure components. The cream or fluid is consequently thoroughly pasteurized and subdivided to obtain a preliminary, but nevertheless very complete subdivision of the particles and the cream-steam-water mixture is brought, by means of the control provided, to optimum condition and temperature and pressure for introduction into the vacuum chamber through the distributor head. That is to say, the subsequent explosive expansion to which the steam-cream-water mixture is subjected in the vacuum chamber will result in the maximum release of volatiles and odoriferous substances. These latter will be continuously removed through the port 65—66 and the cream will continuously coalesce in a highly purified condition and be collected in or from the bottom of the vacuum chamber 10. The collected cream is continuously removed from the vacuum chamber and cooled in a suitable cooler to substantially 70–80° F.

Either an ejector-condenser system or a wet pump and condenser are employed with each of the vacuum chambers shown and described herein.

Instead of using a circulating medium such as hot water or a gas, the heating jacket about the vacuum chamber may be provided with an electrical resistance element as shown in said Horneman and Hammer, Horneman and Parker applications.

In some cases the cream is given a preliminary treatment of steam scrubbing as described herein, before introduction to the surge tank and its pumping into the line. Also in this connection, the treated cream removed from any of the apparatus, may be introduced to a second apparatus, for example, similar to that shown in Figure 1, and given a further steam-scrubbing treatment. Such preliminary or subsequent out of the vacuum chamber scrubbing treatments are not ordinarily required and are not preferred.

As will be appreciated the steam sweeping operation affects a heating of the cream collecting in the vacuum chamber in that the temperature of the cream is maintained constant in accordance with the degree of vacuum in the chamber, and the cream does not suffer any substantial cooling below that which results from its introduction into the vacuum chamber, i. e., there is no appreciable decrease in temperature on account of any slight evaporation which may take place. This steam sweeping, moreover, serves the purpose of maintaining the temperature of the metal wall of the vacuum chamber adjacent to the coalesced liquid, as well as the temperature of the metal partitioning means, constant, thereby preventing any objectionable condensation of the steam.

The invention may be modified in various ways and is subject, of course, to numerous changes, all of which are considered to be comprehended within the scope of the appended claims.

We claim:—

1. An apparatus for treating liquids such as lactic fluids comprising a vacuum chamber, means for maintaining a reduced pressure therein including a withdrawal passage adjacent one end of the chamber, a line communicating with a source of liquid supply and extending within said chamber, said line terminating at its end within the chamber in an outlet whose cross-sectional area is a small fraction of the cross-sectional area of the line, means for injecting steam into the line at a sufficient distance from the said outlet and means for injecting steam into the steam fluid mixture at said outlet, whereby a pressure differential is built up between the line side of the outlet and the vacuum chamber side, and when the mixture is introduced to the chamber violent and spontaneous expansion of the mixture will take place, said outlet discharging the mixture in freely suspended finely broken state, and being disposed sufficiently below the said pressure reducing passage to prevent substantial entrainment and far enough from the bottom of the chamber to give the falling particles projected from the outlet sufficient time for adequate separation of the vapor and liquid phase constituents, said means for creating a reduced pressure operating to remove vapor phase constituents through said passage, and another outlet remotely spaced from said passage for removing liquid phase constituents.

2. An apparatus for treating liquids such as lactic fluids comprising a vacuum chamber, means for maintaining a reduced pressure therein including a withdrawal passage adjacent one end of the chamber, a line communicating with a source of liquid supply and extending within said chamber, said line terminating at its end within the chamber in an outlet whose cross-sectional area is a small fraction of the cross-sectional area of the line, means for injecting steam into the line at a sufficient distance from the said outlet and means for injecting steam into the steam fluid mixture at said outlet, whereby a pressure differential is built up between the line side of the outlet and the vacuum chamber side, and when the mixture is introduced to the chamber, violent and spontaneous expansion of the mixture takes place, said outlet discharging the mixture in freely suspended, finely broken state, a plurality of compartments in the bottom of said vacuum chamber, said compartments communicating with each other, the finely broken suspended mixture being delivered initially to one of said compartments, means for introducing steam to the fluid contained in certain of said compartments, said means for creating a reduced pressure operating to remove vapor phase constituents through said passage, and an outlet communicating with one of said compartments for removing liquid phase constituents.

3. An apparatus for treating liquids such as lactic fluids comprising a vacuum chamber, means for maintaining a reduced pressure therein including a withdrawal passage adjacent one end of the chamber, a line communicating with a source of liquid supply and extending within said chamber, said line terminating at its end within the chamber in an outlet whose cross-sectional area is a small fraction of the cross-sectional area of the line, means for injecting steam into the line at sufficient distance from said outlet whereby a pressure differential is built up between the line side of the outlet and the vacuum chamber side sufficient to cause violent and spontaneous expansion of the mixture introduced to the chamber, said outlet discharging the mixture in freely suspended, finely broken state, a plurality of compartments in the bottom of the vacuum chamber, said compartments being in communication, one of said compartments being substantially centrally disposed, the freely suspended finely broken mixture being discharged into one of said compartments other than the central compartment, means for injecting steam into certain of said compartments, said means for creating a reduced pressure operating to remove vapor phase constituents through said passage, and an outlet from said central compartment for removing liquid phase constituents.

4. An apparatus for treating liquids such as lactic fluids comprising a vacuum chamber, means for maintaining reduced pressure therein including a withdrawal passage adjacent one end of the chamber, a line communicating with a source of liquid supply and extending within said chamber, said line terminating at its end within the chamber in an outlet whose cross-sectional area is a small fraction of the cross-sectional area of the line, means for injecting steam into the line at sufficient distance from said outlet whereby a pressure differential is built up between the line side of the outlet and the vacuum chamber side sufficient to cause violent and spontaneous expansion of the mixture introduced to the chamber, a plurality of compartments in the bottom of said chamber, said outlet discharging the mixture in freely suspended, finely broken state directly into one of said compartments, said compartments being in communicating relation, means for injecting steam into the fluid in certain of said compartments, said means for creating a reduced pressure operating to remove vapor phase constituents through said passage, and another outlet remotely spaced from said passage for removing liquid phase constituents from another of said compartments.

BERNARD W. HAMMER.
HERMAN C. HORNEMAN.
SIDNEY N. QUAM.
FRED F. LOCKWOOD.
HOWARD F. BEERY.
MILTON E. PARKER.